June 18, 1935.  F. ZEMANEK  2,005,487
GLASS BREAKER TOOL
Filed Nov. 20, 1934
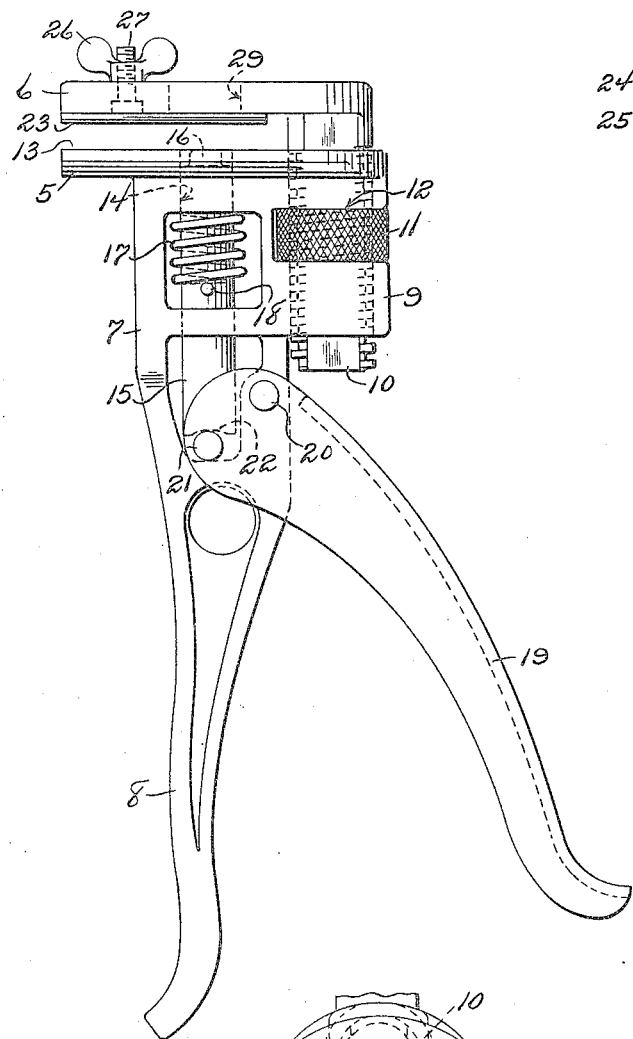
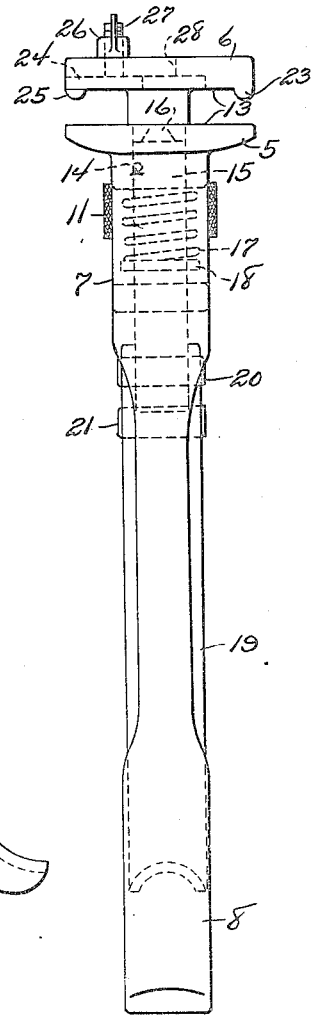
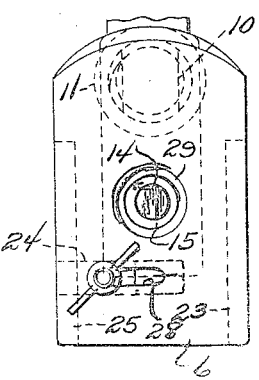
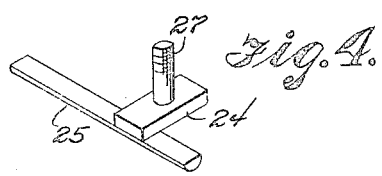
Frank Zemanek
INVENTOR
ATTORNEY Patented June 18, 1935

2,005,487

UNITED STATES PATENT OFFICE 2,005,487

GLASS BREAKER TOOL

Frank Zemanek, Mason City, Iowa, assignor of one-fourth to Frank Kubiak and one-fourth to Tony Zemanek, both of Mason City, Iowa Application November 20, 1934, Serial No. 753,920

5 Claims. (Cl. 49—52)

The invention relates to a glass breaker tool and more especially to a tool for the splitting of glass at the cut therein as effected by a glass cutter.

The primary object of the invention is the provision of a tool of this character, wherein the same can be applied to a piece of glass at the point of the scoring therein by a glass cutter, so that the said glass can be broken along this score for the separation of the glass following a line of cut therein, thus assuring a smooth edge at the line of cut and convenience in the breaking of the glass.

Another object of the invention is the provision of a tool of this character, wherein the same is readily adjustable so as to accommodate glass of varying thicknesses and when operated at the line of cut therein such glass can be broken and the breakage following the line of cut, the tool being manually operated and enabling the breaking of the glass with dispatch and without irregularity in the formation of the edge at its line of cut.

A further object of the invention is the provision of a tool of this character, which is extremely simple in construction, readily and easily operated, thoroughly reliable and efficient in its purpose, manually controlled, strong, durable, capable of adjustment to accommodate itself to different thicknesses of glass being cut, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a side elevation of the tool constructed in accordance with the invention.

Figure 2 is an edge elevation thereof.

Figure 3 is a fragmentary top plan view.

Figure 4 is a perspective view of an adjustable fulcrum for contact with glass.

Similar reference characters indicate corresponding parts throughout the several views in the drawing.

Referring to the drawing in detail, the tool comprises stationary and movable jaws 5 and 6, respectively, the stationary jaw being formed upon a shank 7 terminating in a fixed handle 8. The shank at the edge thereof next to the heel of the jaw 5 is formed with a guide sleeve 9 in which is slidably fitted the stem 10 integral with the movable jaw 6 for adjustment of the latter.

The stem 10 has threaded engagement with an adjusting nut 11 accommodated in a clearance 12 provided intermediate of the guide sleeve 9, the said nut being preferably externally knurled to enable firm finger engagement therewith for the turning of said nut to adjust the jaw relative to the jaw 5 of the tool.

These jaws 5 and 6 at confronting faces are of flat formation, as at 13, which are the work confronting sides thereof and are of substantially the same width with respect to each other to afford a relatively wide gripping area to the tool.

Slidably mounted in the shank 7 through the guide passages 14 provided within and opening outwardly through the jaw 5 is a plunger 15 constituting a punch having the tapered or tit-like work-engaging tip 16 to protrude into the space between the jaws 5 and 6 for contact and pressure against a piece of glass when held between said jaws, the plunger 15 being operated at right angles to the faces of the said jaws. The tip 16 must attack the glass at the line of score or kerf made therein by a glass cutter for effecting the severance or breaking of the glass at this score line or kerf when the said glass is clamped or held between the jaws 5 and 6 which are susceptible of adjustment correspondingly to the thickness of such glass for a smooth break of the same following the kerf or score line therein.

Surrounding the plunger 15 is a coiled compression spring 17 playing against a cross bearing pin 18 carried by said plunger and against the shank 7 at its opposite end, so that the plunger will be tensioned and normally held receded from the working side of the jaw 5.

Swingingly carried by the shank 7 is an operating lever or handle 19, it being pivoted, at 20, thereto for eccentric movement with respect to the plunger 15 and carrying a cross fulcrum pin 21 confronting and engaging a fulcrum seat 22 provided in the end of the plunger 15 next thereto, so that said plunger on exerting pressure upon the lever or handle 19 will be projected through the jaw 5 to have its tip 16 exert pressure upon a glass piece as held between the jaws 5 and 6 in the use of the tool and, as previously indicated, this tip 16 makes contact with the glass at the score or kerf made therein by a glass cutter for the successful breaking of the glass following this kerf or score line and without the breaking of such glass at either side of such score or kerf line.

The working side of the jaw 6 at one longer or side edge thereof has a permanent or fixed contact or bearing rib 23 for engaging the face of the glass confronting the jaw 6. This jaw also has counterseated therein a laterally adjustable slide 24 formed with the adjustable contact or bearing rib 25, a companion to the rib 23 for cooperation whereby the jaw 6 will have bearing by these ribs 23 and 25 upon the glass at opposite sides of the score or kerf line as created therein, so that a flexing of the glass between these ribs 23 and 25 will be had when the tip 16 of the plunger 15 presses against the glass at the score or kerf line and this pressure is counter to the pressure as exerted by the ribs 23 and 25 against the glass and midway relative thereto so that a successful breaking at the score or kerf line of the glass is assured. The adjustment of the rib 25 is had by a winged nut 26 threaded on a screw extension 27 of the slide 24, the extension being slidable in a slot 28 therefor in the jaw 6. This rib 25 has a lateral range of adjustment with respect to the jaw 6 to vary the spacing of said rib 25 with respect to the rib 23 of the tool.

Of course, it will be apparent that the rib 23 integral with the jaw 6 can be entirely dispensed with as the tool will operate successfully for breaking glass in the use of the adjustable rib 25, or such adjustable rib 25 may be eliminated and the use of the fixed rib 23 in substitute therefor.

In the use of the tool, assuming that the same is normally in the condition as shown in Figure 1 of the drawing, the piece of glass to be broken at the score or kerf line created therein by a glass cutter is received between the jaws 5 and 6 by introducing the tool thereto to have the edge of the glass accommodated between said jaws and the jaw 6 is adjusted correspondingly to the thickness of the glass so that both jaws 5 and 6 will clamp the same to have the tip 16 of the plunger 15 align with the score or kerf line in the glass. When the lever or handle 19 is pressed by a person gripping both handles 8 and 19 the plunger 15 will be projected so that the tip 16 thereof will press upon the glass at the kerf or score line, with the result that such glass will be broken at this line without damage thereto and with a smooth broken edge.

In the jaw 6 aligned with the path of movement of the plunger 15 is a clearance opening 29 which constitutes a sight opening for identifying the kerf or score line as created in the glass so that the plunger 15 with its tip can be aligned therewith.

What is claimed is:

1. A tool of the character described comprising opposed gripping jaws, one jaw being formed with widely spaced apart bearing ribs, a punch movably carried by the other jaw for action between the ribs when the said jaws are closed with relation to a piece of work and means for actuating the punch.

2. A tool of the character described comprising opposed gripping jaws, one jaw being formed with widely spaced apart bearing ribs, a punch movably carried by the other jaw for action between the ribs when the said jaws are closed with relation to a piece of work, means for actuating the punch and means for opening and closing the jaws with relation to each other.

3. A tool of the character described comprising a pair of gripping jaws, means for adjusting one jaw relative to the other, a punch movably carried for action between the jaws when clamping work, means for actuating the punch, and raised bearings on the jaw remote from the punch to provide a space in confronting relation to the punch, the said bearings being located at opposite sides with respect to said punch.

4. A tool of the character described comprising a pair of gripping jaws, means for adjusting one jaw relative to the other, a punch movably carried for action between the jaws when clamping work, means for actuating the punch, raised bearings on the jaw remote from the punch to provide a space in confronting relation to the punch, the said bearings being located at opposite sides with respect to said punch and means for changing the position of one raised bearing with respect to the other for varying the space therebetween.

5. A tool of the character described comprising a pair of gripping jaws, means for adjusting one jaw relative to the other, a punch movably carried for action between the jaws when clamping work, means for actuating the punch, raised bearings on the jaw remote from the punch to provide a space in confronting relation to the punch, the said bearings being located at opposite sides with respect to said punch, means for changing the position of one raised bearing with respect to the other for varying the space therebetween and means for tensioning the punch for effecting receding thereof with respect to the jaws for return to normal of said punch after actuation thereof.

FRANK ZEMANEK.